United States Patent [19]
Burtness et al.

[11] 3,890,493
[45] June 17, 1975

[54] CIRCUITRY FOR DETECTING FAULTS IN DUPLICATE CONTROLLERS

[75] Inventors: Richard Duane Burtness, Boulder, Colo.; Garry Carson Hess, Champaign, Ill.; Bliss D. Jensen, Boulder, Colo.

[73] Assignee: Bell Telephone Laboratories, Incorporated, Murray Hill, N.J.

[22] Filed: Mar. 21, 1974

[21] Appl. No.: 453,351

[52] U.S. Cl. .................... 235/153 AE; 235/153 AK
[51] Int. Cl.$^2$ .................... G06F 11/00
[58] Field of Search .............. 235/153 AE, 153 AK; 340/146.1 BE, 172.5; 179/175.2 R, 175.2 C

[56] References Cited

UNITED STATES PATENTS

| | | | |
|---|---|---|---|
| 3,303,474 | 2/1967 | Moore et al. | 235/153 AE |
| 3,557,315 | 1/1971 | Kobus et al. | 235/153 AE |
| 3,618,015 | 11/1971 | Homonick | 340/146.1 BE |
| 3,636,331 | 1/1972 | Amrehn | 235/153 AE |
| 3,720,819 | 3/1973 | Newton et al. | 235/153 AE |
| 3,786,433 | 1/1974 | Notley et al. | 340/172.5 |

*Primary Examiner*—Charles E. Atkinson
*Attorney, Agent, or Firm*—F. W. Padden

[57] ABSTRACT

Circuitry is disclosed for detecting faults in duplicate controllers in a private branch exchange (PBX) system. The circuitry comprises a bidirectional counter which is initialized to a midpoint state and subsequently counts incrementally or decrementally trouble signals signifying noncompleted operations of the active (on-line) controller. The controllers are alternately made active at nominal 10-second intervals. Upper and lower count states of the counter define points at which a controller, identified by the upper or lower state, is generating an intolerable number of trouble signals in relation to its mate. Additional structure includes a second counter which accumulates the number of completed system operations for reinitializing periodically the bidirectional counter to the midpoint state, circuitry for detecting the upper and lower count states, storing the identity of the offending unit, and maintaining it in an off-line state.

17 Claims, 9 Drawing Figures

FIG. 2
NAND GATE
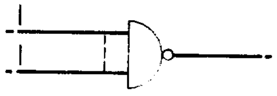
FIG. 3
INVERTED "OR"-
NAND GATE
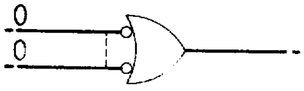
FIG. 4
J-K FLIP-FLOP
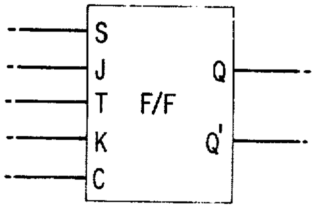
FIG. 5
TRUTH TABLE OF J-K FLIP-FLOP
| S | C | J N-1 | K N-1 | $T_N$ | $Q_N$ | $Q'_N$ |
|---|---|---|---|---|---|---|
| 1 | 0 | - | - | - | 1 | 0 |
| 0 | 1 | - | - | - | 0 | 1 |
| 1 | 1 | - | - | - | * | * |
| 0 | 0 | 0 | 0 | ¯\|_\|¯ | $Q_{N-1}$ | $Q'_{N-1}$ |
| 0 | 0 | 0 | 1 | ¯\|_\|¯ | 0 | 1 |
| 0 | 0 | 1 | 0 | ¯\|_\|¯ | 1 | 0 |
| 0 | 0 | 1 | 1 | ¯\|_\|¯ | $Q'_{N-1}$ | $Q_{N-1}$ |
* INDETERMINATE
N REFERS TO THE PRESENT STATE
N-1 REFERS TO THE PREVIOUS STATE

FIG. 6 INTERCHANGER 17, FIG. 9

FAULT DETECTOR
13

CIRCUITRY FOR DETECTING FAULTS IN DUPLICATE CONTROLLERS

BACKGROUND OF THE INVENTION

This invention relates to circuitry for detecting faults in duplicate system controllers, and particularly to simplified and improved circuit arrangements for simultaneously reducing interferences with controller fault detection operations due to faulty peripheral circuits controlled by the duplicate controllers.

Fault detection arrangements are used in many telephone and data processing systems for identifying and locating troubles which arise in the controller circuits used in such systems. It is known to provide redundant controllers for reliability and continuity of service in the event of system faults and many techniques, such as matching between redundant circuits or majority voting, are known for detecting and/or localizing faulty circuits. Matching techniques involve testing of circuits by dynamically comparing the results of operations performed by duplicated units which are concurrently executing identical operations so that a difference, i.e., a mismatch indicative of faulty operation, is detected immediately. Matching techniques typically require both expensive circuits for dynamically selecting numerous system nodes for comparison and elaborate test sequences for identifying the particular faulty unit after a mismatch detection.

Majority voting is an extension of matching in which the results of operations of three or more redundant circuits concurrently executing the same functions are compared. In the event of a mismatch in results, the technique detects and identifies the faulty circuit and eliminates the need for additional testing means, but at the expense of circuit triplication.

As a result, the above techniques have proven useful only in large control systems where there their high cost is tolerated.

Past attempts at providing economically attractive fault detecting means for small systems controllers, such as those of small private branch exchange (PBX) telephone systems, typically have relied on off-line testing and monitoring devices, as well as numerous circuits for counting rates of error signals generated by the tested circuits. Such prior art arrangements have proven to have inherent disadvantages such as the inability of distinguishing between error signals resulting from the monitored controllers and those signals caused by faults within peripheral circuits and the difficulty of dynamically establishing threshold error signal rates which adequately meet widely varying traffic loads. These deficiencies heretofore may only be remedied by the use of relatively complicated and costly system equipment.

In view of the foregoing, an object of our invention is to provide improved, simplified and economical means for detecting faults in duplicated controllers.

It is another object to reduce the effects of faults within peripheral circuits which might otherwise lead to erroneous determinations of controller faults.

SUMMARY OF THE INVENTION

An illustrative circuit embodiment of our invention provides for improved techniques for detecting faults chiefly in duplicated controllers and with minimal interference from peripheral circuits. Our circuitry does so by interchanging on-line and off-line states of the controllers at short intervals and by employing a single bidirectional circuit for counting trouble signals arising in the on-line, or active, controller during call processing operations.

The bidirectional counting circuit initially begins at a midpoint count state and thereafter counts decrementally for one active controller and incrementally for the other controller when active. The relatively high rate of interchanging allows peripheral circuit faults to be effectively shared equally by each controller during active system work operations. Accordingly, trouble signals generated by such peripheral faults tend to be cancelled out in the subtractive and additive modes of the bidirectional counter as the controllers are alternately switched in status. Advantageously, the resultant count state is indicative of the integrity of the controllers relative to each other. Excursions of the count state which are sufficiently removed from the midpoint count state define points of intolerable controller operation and attainment of such excursions initiates actions for recovering the system.

To elaborate, our exemplary circuitry defines active and standby, or on-line and off-line, ones of the controllers and includes relay apparatus for connecting controlled peripheral circuits exclusively to the active controller via contacts of the relay apparatus. Control circuitry including a ten-second timer which is responsive to end-of-work, or completion, signals arriving from each active controller after timer expiration provides for periodic interchanging of active and standby controllers at nominal ten-second intervals for equal sharing of the controllers by the peripheral circuits.

Our interchange circuitry is arranged not only for normal interchanging operations, but also for locking either controller in the standby state in response to determinations of faulty controller operations.

According to a feature of our invention, our bidirectional counter advantageously provides for simple and economical detection of controller faults by maintaining a continuous difference indication between the numbers of trouble signals generated by each active controller over successive intervals of interchanging operation. The midpoint count state of the bidirectional counter provides a reference point for measuring the relative integrity of the controllers. Faulty operation of particular ones of the controllers is determined by attainment of prescribed lower and upper count states of that counter. We have found that the desired reference count state may be undesirably subject to shifting during counting operations because of trouble signals generated by noise or nonrandom usage of faulty peripheral circuits. If the undesired and shifted count states were not periodically corrected, it would allow the noise resultant trouble signals effectively to change the desired reference point, or midpoint count state, and allow the peripheral units faults to influence and undesirably impair the detection of only faults in the controllers. In accordance with a feature of our invention, we reduce the significance of such random noise or peripheral circuit faults by periodically reinitializing the bidirectional counter to the midpoint count state after a prescribed number of successfully completed operations of both controllers. For this feature, we provide a counter for counting functional work completion signals from each active controller until the prescribed number is reached. Upon reaching the prescribed number of completion signals, logic apparatus of our invention advantageously causes the reinitialization of the bidirectional counter to the midpoint count state and recycles the work completion counter for beginning counting anew.

Steering circuits under control of the interchange circuits provide for routing both completion and trouble signals from the active controller to our completion and bidirectional counters.

Decoding circuits of our illustrative embodiment operate for detecting the prescribed lower and upper count states which define faulty controller operation and provide for immediate recovery of the system. It does so by activating the interchange circuitry for locking the faulty controller off-line. According to our invention, the decoding logic activates a circuit that stores an identification of the detected lower or upper count state for faulty controller identification and system recovery actions. Portions of our steering circuits are deactivated by faulty controller identification and provide for simply maintaining the faulty controller off-line by inhibiting further count signal inputs to both the completion and trouble signal counters. Advantageously, this locks into the bidirectional counter the faulty controller identifying lower or upper count state which, in turn, maintains activation of the interchange circuitry locking circuits.

Our illustrative fault-detecting circuitry is advantageously employed in an exemplary private branch exchange (PBX) switching system utilizing the duplicated controllers. The exemplary system comprises a plurality of peripheral units, such as line circuits, trunk circuits, and a network for interconnecting peripheral circuits for routine processing of calls. The peripheral system circuits are connected through relay contacts of our interchange circuitry to one of the controllers defined as active for system control operations. The contacts are operated periodically by our interchange circuitry at nominal tensecond intervals for equal sharing of the peripheral system by both controllers. In addition, both controllers communicate work completion and trouble signals to our circuitry for controller fault detection processing.

BRIEF DESCRIPTION OF THE DRAWING

A complete understanding of our invention is facilitated by a reading of the following description in conjunction with the drawing in which:

FIGS. 2 and 3 introduce symbolic notations of NAND and INVERTED-OR NAND gates illustratively used in our invention;

FIGS. 4 and 5 introduce the symbolic notation of J-K flip-flops and the truth table therefor.

DETAILED DESCRIPTION

A. Description of System Operation (FIG. 1)

Figure 1:
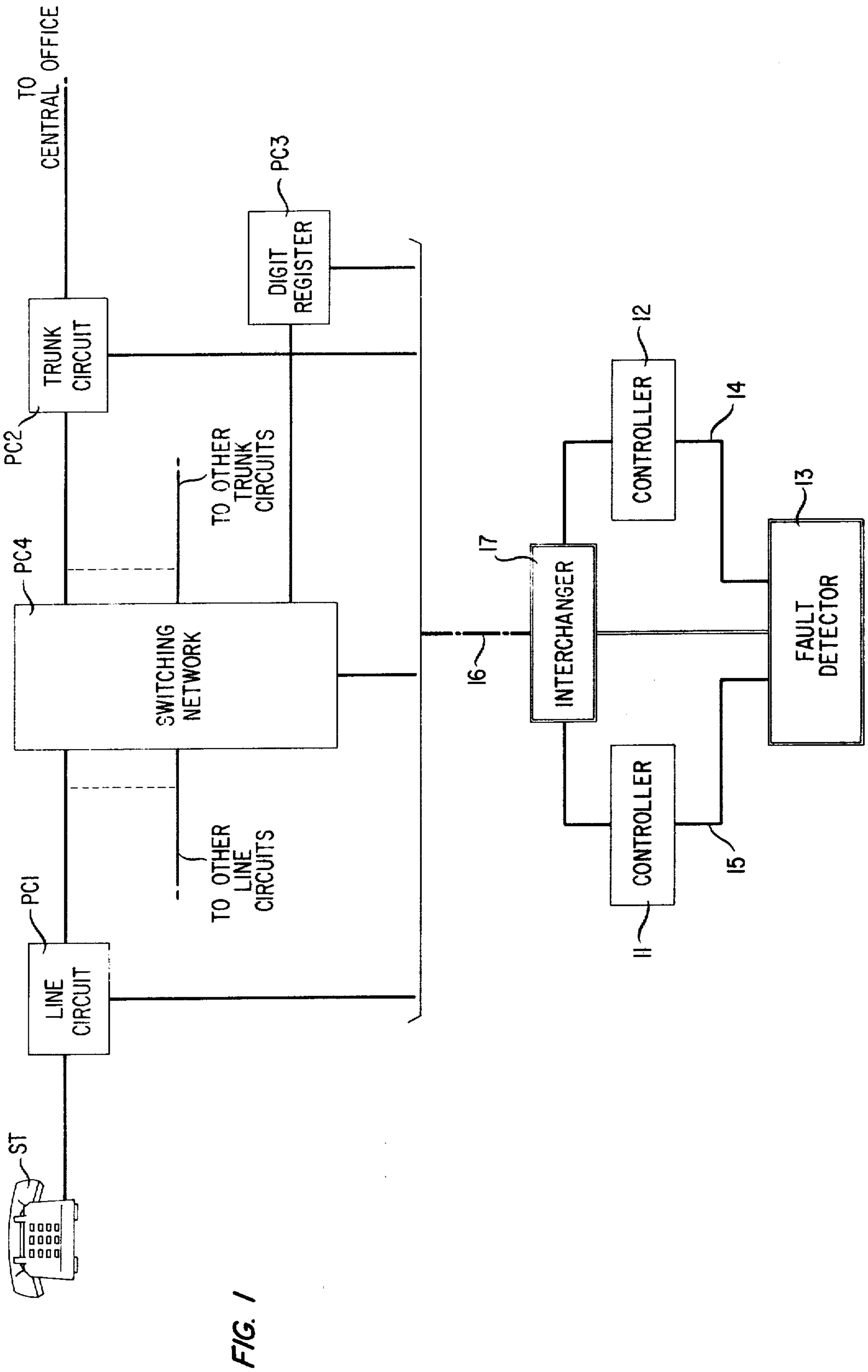
FIG. 1 discloses the structural organization of the exemplary PBX switching system illustratively embodying our fault detecting and interchanging circuitry.

Our fault detecting and interchanging circuitry is incorporated into the exemplary PBX system of FIG. 1 for detecting faults in controllers 11 and 12. Controllers 11 and 12 exercise controlling operations of peripheral circuits consisting of a conventional subscriber line circuit PC1, trunk circuit PC2, digit register PC3, and a switching network PC4 for interconnecting line and trunk circuits during routine processing of calls to and from subscriber stations, such as ST, and central office trunks such as PC2.

Interchanger 17 both defines and interconnects the peripheral units selectively and mutually exclusively to the active one of controllers 11 or 12 via conductors 16. Interchanger 17 includes circuitry, described hereinafter in detail, for periodically switching the active and standby controllers at nominal ten-second internals. Advantageously, this operation provides for routinely exercising both controllers, for eliminating effects of peripheral faults in the controller fault detecting process and for allowing for a comparison of integrity between controllers 11 and 12.

The switched conductors 16 comprise only those necessary for communicating commands from the active controller to the peripheral circuits. Conductors (not shown) for communicating information from the peripheral circuits to the controllers are not switched but bussed directly to both controllers. Advantageously, this reduces the required number of switching elements in interchanger 17 and allows both controllers to execute operative sequences concurrently while still limiting peripheral controlling operations to the active controller.

The system of FIG. 1 is illustratively of a design as disclosed in U.S. Pat. No. 3,746,797 issued July 17, 1973, to H. A. Meise, Jr. and G. W. Taylor. Our specification and drawing discloses only those details of the system needed for a full understanding of our invention. Reference for other features of the system may be obtained from the Meise et al. patent.

Limiting our discussion to only the active controller, the system operates to provide routine call processing functions as follows. In response to signals from peripheral circuits indicating requests for service, the active controller enters operative sequences, referred to in the Meise et al. patent as the line dial tone (LDT) and read register (RR) modes, for controlling operations of peripheral circuits. Upon completion of a command from the controller, e.g., a command to network PC4 to establish a connection between a specific line and trunk circuit, the addressed peripheral circuit returns a signal to the controller for terminating the mode. A mode timer in the controller is activated concurrently with initiation of the modes and retired upon receipt of the termination signal for determining if mode completion occurs within a tolerable interval defined by the mode timer. In the event a fault or spurious error, either in the controller or in a peripheral circuit, excessively delays or prevents mode execution, the mode timer expires and produces a trouble signal for terminating the mode and for resetting the controller. Such completion and trouble signals are sent to our circuitry for controller fault detecting actions as will be described in detail.

More specifically, the system operates as follows. An off-hook signal is detected by line circuit PC1 when the subscriber at station ST lifts the handset. Line circuit PC1 responds by gating a service request signal to the active controller for causing it to enter the LDT mode, as described in detail in Meise et al. at columns 15 to 18. In that mode, the active controller directs commands for establishing a connection through network PC4 between line circuit PC1 and an idle register PC3.

Thereafter, network PC4 sends a reset signal to the controller for releasing the mode. Register PC3 concurrently returns dial tone over the established connection and subsequently stores incoming digits. When completed, register PC3 sends a readout request signal to the active controller. The controller responds by entering the RR mode and uses the stored digits for establishing a call connection through network PC4 between station ST and the called destination via, for example, trunk circuit PC2. Thereafter a reset signal is sent from the network for releasing the controller and terminating the RR mode, as described in Meise et al. columns 18 to 23.

Not disclosed in Meise et al., but illustratively integrated into each controller, is circuitry including the aforementioned mode timer for generating mode time-out, or trouble, signals in the event of unsuccessful completion of modes, and circuitry for generating mode completion signals upon successful termination or abandonment by time-out of the LDT and RR modes. Both the mode time-out and mode completion signals are routed from controllers 11 and 12 to fault detector 13 via conductors 14 and 15 in FIG. 1 for processing as described hereinafter. Circuit arrangements for generating such signals are well known and a detailed disclosure is not necessary for an understanding of our invention.

B. Logic Elements (FIGS. 2 and 3)

Our fault detecting and interchanging arrangements illustratively use logic elements such as well-known AND NOT (NAND) gates which are disclosed in detail in Meise et al. at columns 9 and 10 and in FIGS. 3A, 3B and 3D. In FIGS. 2 and 3 of our drawing we illustrate two graphical symbols of such NAND gates which are used in FIGS. 6, 7, and 8 for a detailed disclosure of our arrangements. The symbol of FIG. 2 is used to indicate a gate which is "active" and responsive to logical ones, or high potentials concurrently appearing at each of its inputs for producing a logical zero, or low potential, at its output (a positive-AND operation). Conversely, the symbol of FIG. 3 is used to represent an INVERTED-OR NAND gate, which is active and responsive to a logical zero appearing at any of its inputs for producing a high potential at its output (a negative-OR operation).

We further illustratively use a prior art J-K flip-flop having the graphical symbol shown in FIG. 4 and state table shown in FIG. 5.

As is shown by the state table, the set and reset states of the flip-flop are jointly controlled by signal states on the S (set), C (clear), J and K inputs and negative-going pulses on the toggle (T) input. In particular, with non-overriding low signals on both the S and C inputs and with high states on both the J and K inputs, each negative pulse on input T results in reversing the state of the flip-flop. Such toggling control may be suspended, however, and the flip-flop immediately placed and held in a desired set or reset state by applying a high potential to the respective S or C inputs.

Such J-K flip-flops are well known and are commercially available. A detailed disclosure of such flip-flop operation is not necessary for a complete understanding of our invention.

C. Description of the Interchange and Fault Detector Circuitry (FIGS. 6, 7 and 8)

Figure 6:
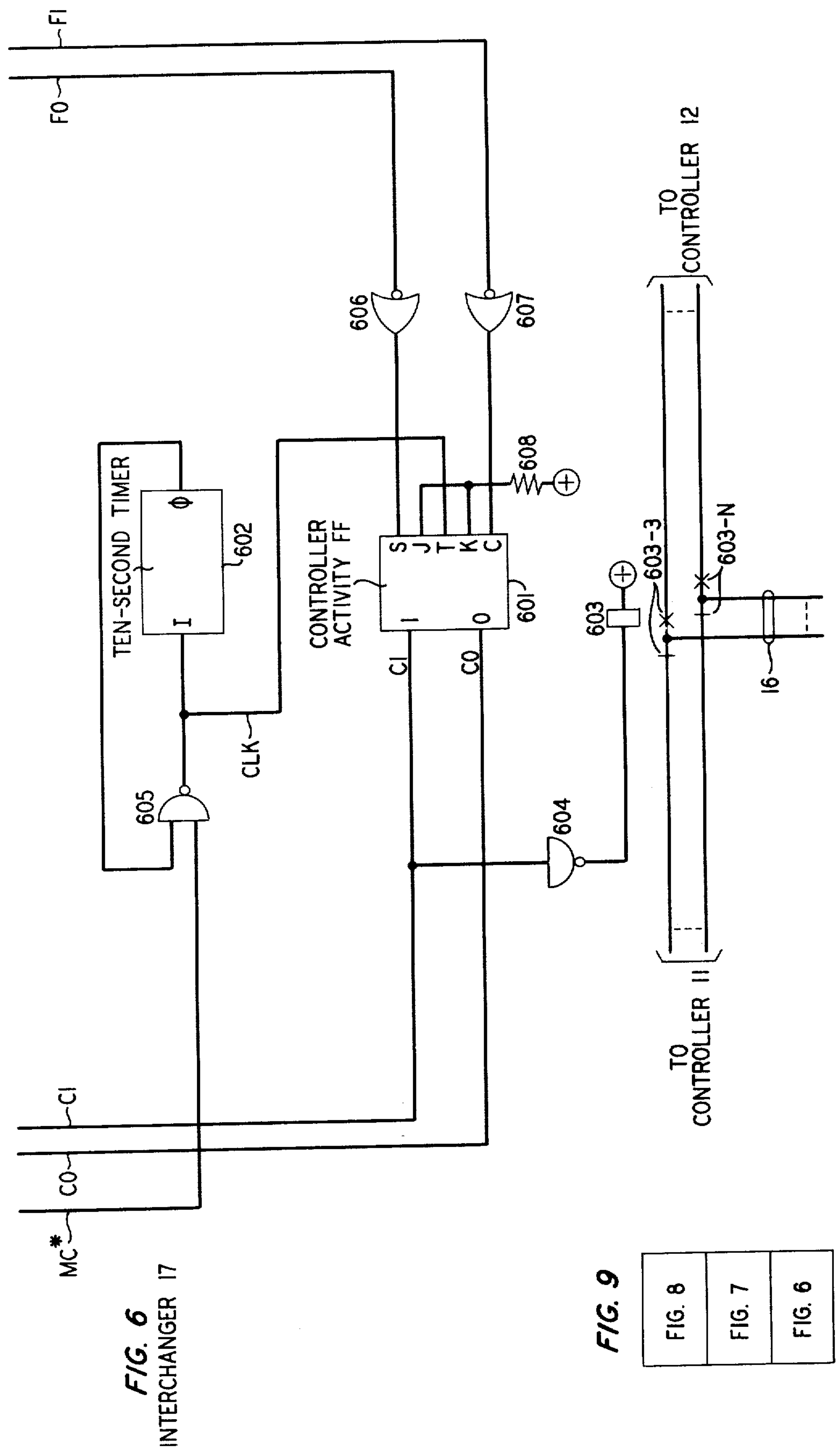
FIGS. 6, 7 and 8, when arranged according to FIG. 9, disclose the specific exemplary embodiment of the fault detecting and interchanging circuitry.
Figure 7:
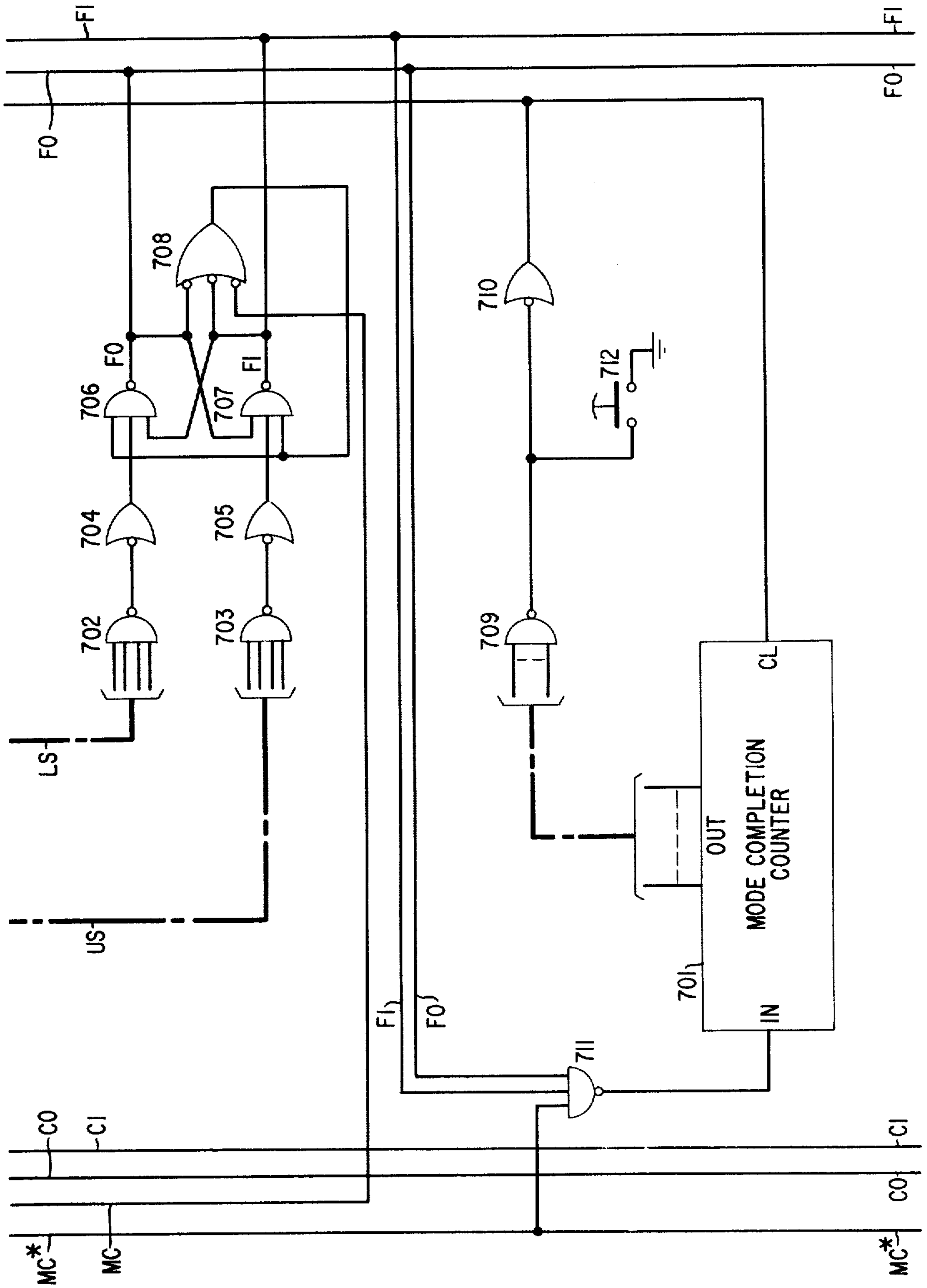
Figure 8:
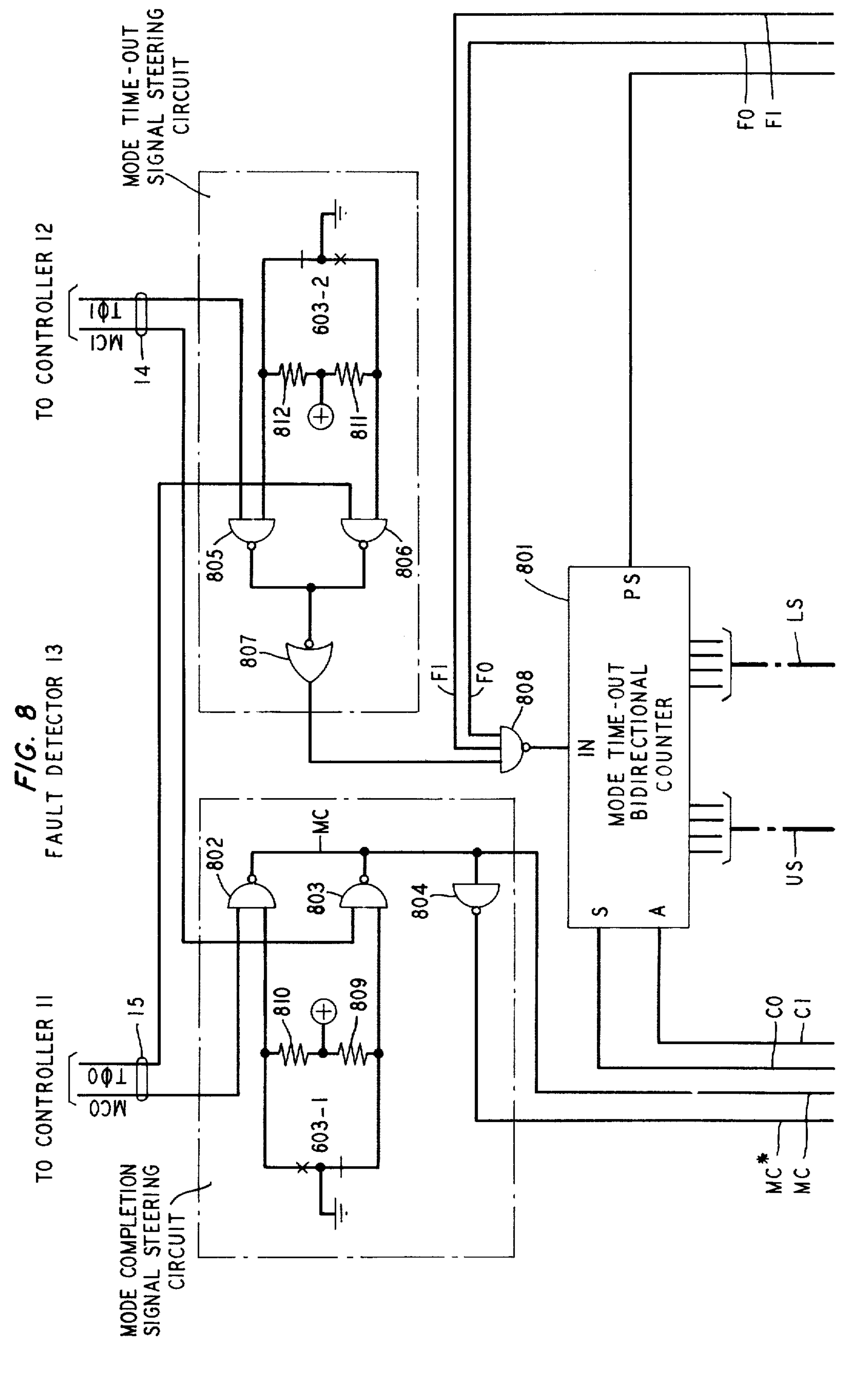

As an aid in reading the following description, elements of our invention in FIGS. 6, 7, and 8 and other than those blockwise depicted in FIG. 1, are referenced by numbers in which the leading digit refers to the figure in which the element appears.

We provide circuitry at the bottom of FIG. 6 comprising transfer relay 603 and its transfer contacts 603-3 to 603-N for connecting the outputs of the active one of controllers 11 or 12 to conductors 16 for controlling operations of peripheral system circuits. Control circuitry, which is described in detail below, operates for interchanging the active and standby controllers periodically by changing the operated and released state of relay 603.

Communication arrangements between controllers 11 and 12 and our fault detecting and interchanging circuitry are shown at the top of FIG. 8. Specifically, mode completion signals indicating end-of-work operations of the controllers and mode time-out signals signifying noncompleted work operations of the controllers are received on conductor 15 from controller 11 and on conductor 14 from controller 12. To elaborate, positive going mode completion signals appear on leads MC0 and MC1 and are processed though the completion signal steering circuit which functions for passing signals only from the active controller to other elements of our fault detecting and interchanging circuitry. Similarly, positive-going mode time-out signals appear on leads TO0 and TO1 and are processed through the time-out steering circuit which likewise operates for passing such signals only from the active controller.

FIGS. 7 and 8 disclose the details of our fault detecting circuitry. Our invention is best understood, however, by first focusing attention on the details of interchanger 17 shown in FIG. 6.

Interchanger 17 is arranged for switching the active and standby states of controllers 11 and 12 at approximate ten-second intervals so that both controllers are shared equally by common peripheral circuits. It comprises J-K flip-flop 601 whose state defines the active controller and whose outputs C0 and C1 provide signals for controlling the bidirectional counting modes of counter 801 and the state of transfer relay 603 which interconnects peripheral circuits exclusively to the active controller. Interchanger 17 also includes timer 602 which cooperates with completion signals from the mode completion steering circuit for periodically initiating state transitions of flip-flop 601.

Flip-flop 601 is arranged to be in a reset state (output lead C0 high) when controller 11 is active and in a set state (output lead C1 high) when controller 12 is active. Transfer relay 603 is driven by gate 604 whose input connects.to lead C1 of flip-flop 601. When controller 11 is active, the output of gate 604 is high; no current flows through relay 603 due to the zero potential across its coil and relay 603 is rendered nonoperated. In this state, transfer relay 603 break contacts 603-3 to 603-N connect the peripheral system via conductors 16 to the active controller 11 while simultaneously isolating controller 12 by means of the corresponding open make contacts. Conversely, the output of gate 604 is low when controller 12 is defined by flip-flop 601 to be active; relay 603 is operated due to current flow from a potential source through its coil to the ground at the output of gate 604. In this event, make contacts 603-3 to 603-N connect controller 12 to the peripheral system in an obvious manner.

Ten-second timer 602 and gate 605 cooperate in response to signals from the mode completion steering circuit for periodically toggling flip-flop 601 and switching the active and standby states of controllers 11 and 12. Positive-going completion signals appearing on lead MC* from the mode completion steering circuit are applied to the lower input of gate 605. The upper input of gate 605 is connected to output 0 of timer 602 which is internally arranged in a well-known manner to be low during active timing intervals and high after expiration.

While timer 602 is actively engaged in timing operations, its low output disables gate 605 which causes mode completion signals at the other input of gate 605 to be ignored. After expiration of the ten-second timing interval by timer 602, its 0 output is high which partially enables gate 605. Gate 605 is totally enabled by the first completion signal received after expiration of timer 602 and generates a low-going pulse on lead CLK. This pulse is applied to input I of timer 602 for initiating a new tensecond timing interval and also to the T input of flip-flop 601. In the absence of a detected controller fault, the set (S) and clear (C) inputs of flip-flop 601 are low, as shown in detail hereinafter. The J and K inputs are high by virtue of connection to a positive potential source. Under these circumstances, the recurring pulse at input T switches the state of J-K flip-flop 601 as shown in FIG. 5. and resultingly the active and standby states of the controllers.

We turn now to a detailed discussion of the signaling arrangements between controllers 11 and 12 and our fault detecting circuitry and specifically to operations of the mode completion and mode time-out signal steering circuits in FIG. 8. Mode completion signals from controllers 11 and 12 appear as high-going pulses on incoming leads MC0 and MC1, respectively, in FIG. 8. The mode completion steering circuit comprising gates 802,803 and transfer contacts 603-1 operate for propagating only completion signals received from the active controller as defined by flip-flop 601 and transfer relay 603 of interchanger 17. Recall that relay 603 is released when controller 11 is active. In this event, break contact 603-1 completes a path from the lower input of gate 803 to ground, turning off the gate and preventing propagation of completion signals received on lead MC1 from standby controller 12 which are applied to the upper input of gate 803. Make contact 603-1 is open allowing a high potential to be applied through resistor 810 to the lower input of gate 802. Completion signals from controller 11 which are received on lead MC0 and appear at the upper input of gate 802 totally enable the gate and are passed to its output as negative pulses. The outputs of gates 802 and 803 are collector-wired in a well-known manner to produce a NEGATIVE-OR logic function resulting in negative pulses on lead MC which correspond to mode completion signals from the active controller 11. These pulses are inverted by gate 804 and produce positive signals on lead MC*.

Likewise, when controller 12 is defined as active, gate 803 is partially enabled by a potential through resistor 809; gate 802 is turned off by ground at its lower input appearing through make contact 603-1. This arrangement allows completion signals from controller 11 to be ignored by gate 802 and those from controller 12 appearing on lead MC1 to be passed to lead MC as negative going pulses. These signals on MC and MC* are routed to various parts of our circuitry such as interchanger 17 for controlling periodic controller interchanging operations and to counter 701 for other control operations which are fully explained hereinafter.

Mode time-out signals are received from controllers 11 and 12 on lead T00 and T01, respectively, in FIG. 8 as high-going pulses and are applied to inputs of gates 805 and 806. These gates are controlled by transfer contacts 603-2 and function similarly to the completion signal steering circuitry described above for propagating time-out signals from the active controller to the output of gate 807 as high-going pulses.

The time-out signals from gate 807 are passed to bidirectional counter 801 for decremental and incremental counting operations incident to the detection and identification of faulty controller operation.

Bidirectional counters, such as 801, are well known. Specifically, our counter is arranged to be set to a prescribed midpoint count state, illustratively decimal eight, by placing a high signal on counter 801 input PS. At system start time, the operator performs this operation by depressing switch 712 and applying ground to the input of gate 710 which is inverted for applying a high to input PS. Steady-state signals on leads C0 and C1, identifying the active and standby controllers, are applied to inputs S and A of counter 801 and place the counter in a decremental counting mode when controller 11 is active and in an incremental mode when controller 12 is active. Thereafter, time-out signals from the active controller appearing at the output of gate 807, as hereinbefore described, are passed through gate 808 to input IN of counter 801 because the remaining inputs of gate 808 (F0 and F1) are high in the absence of a detected controller fault as will be shown. These time-out signals are subtracted or added to the current count state 801 in accordance with decremental and incremental mode control states on inputs A and S.

As controllers 11 and 12 are alternately made active, a faulty controller or operatively inferior one relative to the other controller will generate more time-out signals than its mate, causing the count state of counter 801 to move from the initial midpoint count state decreasingly or increasingly according to whether controller 11 or 12 is the faulty or inferior one. Lower and upper count states, illustratively decimal three and thirteen, of counter 801 define values at which the undesired controller is determined to be operationally intolerable.

It is understood then that the midpoint count state serves as a reference point from which the integrity of each controller is compared to its mate controller by excursions of counter 801 away from the midpoint count state decreasingly or increasingly toward either the lower or upper threshold count states. As time-out signal counts accrue against, say, controller 11 during its active periods, then equal numbers of time-out signals must be received from controller 12 during its active intervals before counts begin to accrue against controller 12.

It may be understood that an undesirable effective shifting of the reference count state can occur by receipt of time-out signals from one controller due to an isolated noise condition or unpredictable nonrandom usage by a single controller of a faulty peripheral circuit. Such an undesirable shifting, if left uncorrected, could impair the advantages of our fault detecting arrangements and interfere with the inherent ability of our invention to discriminate between controller faults and peripheral circuit faults. In order to prevent such undesirable effects, we provide circuitry including mode completion counter 701 for periodically initializing counter 801 to the initial midpoint count state.

Specifically, counter 701 is responsive to completion signals from the active controller appearing on lead MC* as high pulses. In the absence of a detected controller fault, inputs F0 and F1 of gate 711 are high as described below. The completion signals are passed through gate 711 as low pulses to input IN of counter 701 where they are accumulated. A logic network, illustratively shown as gate 709, is arranged to detect a prescribed count state of counter 701, 128 completed mode operations in our exemplary embodiment, and responds by generating a low at the output of gate 709 which is inverted to produce a high at the output of gate 710 for periodically initializing counter 801 to the midpoint count state during routine call processing operations. The high is also extended to input CL of counter 701 for clearing its internal counting stages in a well-known manner and for beginning a new counting interval.

Detection of the lower and upper threshold count states is performed by decoding gates 702 and 703 whose inputs are connected via wires LS and US to internal counting stages of counter 801 in a well-known manner. Specifically, gate 702 is activated by the presence of the lower count state which manifests itself by applying all ones to the gate inputs. Gate 702 initiates fault recovery actions to place controller 11 into a standby status by partially enabling gate 706 through gate 704. Similarly, gate 703 operates for detecting the upper count state (associated with controller 12) and responds by partially enabling gate 707 through gate 705. Gates 706 and 707 form a flip-flop whose outputs F0 and F1 are both high until the flip-flop is activated jointly by detection of either the low or upper count state and a subsequent high pulse at the output of gate 708. The output of gate 708 is maintained low in the absence of a detected controller fault by its high input F0, F1 and lead MC which is normally high and which conveys negative mode completion signals from the active controller. An activation of decoding gate 702 or 703 cooperates with receipt of a mode completion signal from the active controller for activating gate 706 and 707 as follows. The controllers are arranged for generating mode completion signals in response to termination of modes by both normal work operations occurring during routine call processing functions and abnormal abandonment of call operations which result from mode time-outs. Resultingly, both mode time-out signals and mode completion signals are concurrently received by the fault detector on leads T00, T01, MC0 and MC1 and are steered as hereinbefore described to appropriate circuits for processing. The completion signals from the active controller appear on lead MC as low signals which are routed to the lower input of gate 708 and result in generating a high pulse at its output which partially enables flip-flop gates 706 and 707. Concurrent with this enabling operation, a mode time-out signal, if received from the active controller, is routed to counter 801 for decremental or incremental counting operations and may result in attainment of the lower or upper threshold count state. The durations of the completion and time-out signals are designed to overlap sufficiently so that, if either threshold count state is achieved, all inputs of the appropriate one of flip-flop gates 706 and 707 are high for a portion of the duration of the completion and time-out signals. As a result, lead F0 or F1, whichever corresponds to the detected count state, is forced low. By virtue of inputs F0 and F1 to gate 708, its output remains high after disappearance of the completion signal and permanently enables flip-flop gates 706 and 707. The low on lead F0 or F1 is also extended to inputs of gate 808 for inhibiting further counting operations of counter 801, thereby maintaining the presence of the detected lower or upper count state. This maintains the activated states of lower and upper count state decoding gates 702 and 703 which completes the enabling of flip-flop gates 706 and 707.

The low on lead F0 or F1 identifies the faulty controller (controller 11 or 12, respectively) and initiates fault recovery actions to place the faulty controller in standby status by applying a low to gate 606 or 607. The low is inverted and applies a high to either the set (S) or clear (C) inputs of J-K flip-flop 601 of interchanger 17.

A high at the S input of flip-flop 601 indicating that controller 11 is faulty results in immediately setting the flip-flop and switching controller 12 into active status. Resultingly, transfer relay 603 is operated by 601 through gate 604 for connecting controller 12 to peripheral circuits via make contacts 603-3 to 603-N. J-K flip-flop 601 is internally arranged in a well-kno‹ . manner so that a high on the S input removes flip-flop state control from its toggling input T and locks the flip-flop into the set state. The periodic controller interchanging signals generated by timer 602 and gate 605 which are applied to the T input have no effect in modifying the state of 601 until manual actions described below are taken to restore interchanging operation.

Similarly, a high at the C input of flip-flop 601 immediately resets the flip-flop for placing faulty controller 12 into standby status. In this event, active controller 11 is connected through break contacts 603-3 to 603-N to peripheral circuits for controlling system operations. A high at the C input likewise inhibits toggling operations of flip-flop 601 due to signals applied to the T input.

It is seen from the above description that we retain a detected lower or upper threshold count state in counter 801 for maintaining a faulty controller off-line. In this event, counter 701 must be deactivated in order to prevent subsequent counting operations of mode completion signals from reinitializing counter 801 to its midpoint count state. We deactivate counter 701 by inhibiting completion signal count inputs. Leads F0 and F1 comprise the remaining inputs of gate 711 through which mode completion signals are passed to counter 701. In the event a controller fault is detected, one of these leads becomes low as previously described and disables gate 711. As a result, the count state of counter 701 remains static after detection of a faulty controller and periodic reinitializations of counter 801 are prevented.

After repair of the faulty and standby controller, interchanging operation may be restored manually by depressing switch 712 which applies a ground signal to the input of gate 710. The resulting high output extends to the PS input of counter 801 for initializing it to the midpoint count state, as hereinbefore described. Resultingly, upper and lower count state decoding gates 702 and 703 are deactivated and the mid-inputs of gates 706 and 707 are forced low. Leads F0 and F1 are both placed in a stable high state by the lows on the mid-inputs of gates 706 and 707 and the S and C inputs of flip-flop 601 are low by inversion of leads F0 and F1 through gates 606 and 607. This state relinquishes control of the flip-flop 601 to signals on the T input and restores periodic interchanging operations of the active and standby controllers.

It is to be understood that the hereinbefore described arrangements are illustrative of the application of principles of our invention. In light of this teaching, it is apparent that numerous other arrangements may be devised by those skilled in the art without departing from the spirit and scope of the invention.

What is claimed is:

1. Fault detector circuitry for first and second system controllers and means alternately connecting each one of said controllers individually to peripheral system circuits at prescribed intervals for active and standby control of system operation, said detector circuitry comprising means for decrementally and incrementally counting trouble signals from connected active ones of said controllers, means responsive to said counting to prescribed decremental and incremental count states of said counting means for identifying a faulty one of said controllers, and means activated by said identifying means for controlling said connecting means to switch a faulty one of said controllers into a standby control state.

2. The invention of claim 1 further comprising means activated by said connecting means for steering said trouble signals from each connected one of said controllers to said counting means, said counting means having means controlled by said connecting means for decrementally and incrementally counting said trouble signals received through said steering means from said first and said second controllers.

3. The invention of claim 1 further comprising counter means for counting controller successful operation signals, means controlled by said connecting means for steering said operation signals from each connected one of said controllers to said counter means, and means responsive to a predetermined count state of said counter means for periodically operating said counting means to a reference count state between said prescribed decremental and incremental count states thereof.

4. Fault detector circuitry for first and second system controllers and means alternately connecting each one of said controllers individually to peripheral system circuits at prescribed intervals for active and standby control of system operations, said connecting means being operable for locking either of said controllers into a standby control state, said detector circuitry comprising bidirectional counter means having a prescribed initial midpoint count state and being responsive to trouble signals from said controllers under control of said connecting means for decrementally counting said trouble signals from a connected said first controller and counting incrementally said trouble signals from a connected said second controller to provide a continuous comparative indication of the integrity of each of said first and second controllers, means for counting signals signifying completed work operations of connected ones of said controllers, means responsive to a prescribed count state of said counting means for periodically reinitializing said bidirectional counter means to said midpoint count state, means for detecting the presence of prescribed lower and upper count states of said bidirectional counter means identifying preferred and nonpreferred ones of said first and second controllers, and means activated by said detecting means for operating said connecting means to lock a nonpreferred one of said controllers into said standby control state.

5. The invention of claim 4 further comprising logic means controlled by said connecting means for steering said trouble signals from each connected one of said controllers to said counter means, said counter means having a decremental count mode activated by said connecting means for a connected said first controller and an incremental count mode activated by said connecting means for a connected said second controller for counting said trouble signals received from said steering logic means.

6. The invention of claim 4 further comprising logic means controlled by said connecting means for steering said completed work operation signals from each connected one of said controllers to said counting means.

7. The invention of claim 4 wherein said operating means comprises means activated by said detecting means in cooperation with receipt of one of said completed work operation signals for storing an identifying indication of a detected one of said lower and upper count states present in said counter means, and an activation of said storing means being effective for controlling operations of said connecting means to lock said nonpreferred one of said controllers identified by said stored indication into said standby control state.

8. The invention of claim 7 further comprising means responsive to activation of said operating means for preserving detected ones of said lower and upper count states in said counter means to maintain activation of said operating means.

9. The invention of claim 8 wherein said preserving means comprises logic means enabled by activation of said storing means for inhibiting said trouble signal inputs to said counter means, and other logic means enabled by activation of said storing means for inhibiting said completed work operation signal inputs to said counting means to prevent reinitializing of said counter means to said midpoint count state.

10. The invention of claim 9 further comprising means manually operated for setting said counter means to said midpoint count state to restore alternate connecting operations of said connecting means.

11. Circuitry for detecting faults in first and second system controllers and means for connecting said controllers individually to peripheral circuits for active and standby control of said peripheral circuits, said circuitry comprising means for periodically interchanging active and standby ones of said controllers by controlling operations of said connecting means, bidirectional counter means having a prescribed initial count state and being responsive for counting from said initial count state decrementally trouble signals from an active said first controller and incrementally trouble signals from an active said second controller, means for detecting prescribed count states of said counter means decrementally and incrementally removed from said initial count state and signifying a faulty one of respective said first and said second controllers, and control means responsive to said detecting means when activated for controlling operations of said interchanging means to switch said faulty one of said controllers into a standby control state.

12. The invention of claim 11 further comprising means controlled by said connecting means for steering said trouble signals only from each active one of said controllers to said bidirectional counter means, said bidirectional counter means having counting modes controlled by said interchanging means for decrementally and incrementally counting said trouble signals from said respective first and said second controllers to provide over successive ones of said time intervals a comparative indication of the relative integrity of each of said controllers.

13. The invention of claim 11 further comprising means for counting signals signifying completed operations of each active one of said controllers, means controlled by said connecting means for steering said completion signals only from each active one of said controllers to said counting means, and means responsive to a prescribed count state of said counting means for periodically activating said bidirectional counter means to said initial count state.

14. The invention of claim 11 wherein said interchanging means comprises means operable for defining active and standby ones of said controllers, and means for periodically operating said defining means after expiration of prescribed time intervals to cause said connecting means to switch active and standby ones of said controllers.

15. The invention of claim 14 wherein said means for operating said defining means comprises means for generating said prescribed time intervals, means activated by said generating means after expiration of one of said time intervals in cooperation with a receipt of a signal signifying a completed operation of an active one of said controllers for initiating an active and standby controller switching operation of said defining means, wherein said generating means is responsive to an activation of said initiating means for causing said generating means to generate another one of said prescribed time intervals.

16. The invention of claim 14 wherein said control means comprises means activated by said detecting means for storing the identity of a detected one of said prescribed count states, said activated storing means being effective for locking operated said defining means to preclude further switching of said faulty one of said controllers from a standby status.

17. A circuit connectable to first and second private branch exchange system controllers for detecting faults in said controllers comprising flip-flop circuitry for defining active and standby ones of said first and second controllers, and being operable for alternating active and standby ones of said controllers and further operable for locking a faulty one of said controllers in a standby control state, a transfer relay operated and released under control of said flip-flop circuitry and having means for connecting each one of said controllers individually to peripheral circuits, timing means for generating successive predetermined time intervals, means activated in response to concurrence of expiration of one of said time intervals and a receipt of a signal signifying completed mode operations of the then active one of said controllers for operating said flip-flop circuitry in an absence of a prescribed number of faults in said active one of said controllers to alternate said active and standby ones of said controllers, means activated concurrently with operation of said flip-flop circuitry for operating said timing means to generate another one of said predetermined time intervals, a bidirectional counter having a prescribed initial midpoint count state and decremental and incremental counting modes controlled by said flip-flop circuitry for counting trouble signals signifying noncompleted operations of each active one of said controllers decrementally when said first controller is active and incrementally when said second controller is active, means controlled by contacts of said relay for steering said trouble signals only from each active one of said controllers to said counter, a mode completion counter for counting said completed mode operation signals from each active one of said controllers, means controlled by other contacts of said relay for steering said completed operation signals only from each active one of said controllers to said mode completion counter, means activated by a prescribed count state of said mode completion counter for periodically reinitializing said bidirectional counter to said midpoint count state, means for detecting prescribed lower and upper count states of said bidirectional counter indicating a faulty one of said first and said second controllers, storage means activated by said detecting means for operating said flip-flop circuitry to lock a faulty active one of said controllers identified by a detected one of said lower and upper count states into said standby state, logic means enabled by activation of said storage means for preserving said detected one of said lower or upper count states in said bidirectional counter to maintain activation of said storage means, and switch means operable for manually reinitializing said bidirectional counter to said midpoint count state to remove locked control of said flip-flop circuitry to restore alternating operations of said active and standby ones of said controllers.

* * * * *